(12) United States Patent
Monjuji (10) Patent No.: US 10,761,387 B2
(45) Date of Patent: Sep. 1, 2020

(54) LIQUID CRYSTAL DISPLAY DEVICE AND MANUFACTURING METHOD THEREOF

(71) Applicant: JVC KENWOOD Corporation, Yokohama-shi, Kanagawa (JP)

(72) Inventor: Hiroaki Monjuji, Yokohama (JP)

(73) Assignee: JVC KENWOOD CORPORATION, Yokohama-Shi, Kanagawa (JP)

( * ) Notice: Subject to any disclaimer, the term of this patent is extended or adjusted under 35 U.S.C. 154(b) by 44 days.

(21) Appl. No.: 16/196,621

(22) Filed: Nov. 20, 2018

(65) Prior Publication Data

US 2019/0271890 A1 Sep. 5, 2019

(30) Foreign Application Priority Data

Mar. 5, 2018 (JP) ................................ 2018-038466

(51) Int. Cl.
| | |
|---|---|
| G02F 1/1362 | (2006.01) |
| G02F 1/1339 | (2006.01) |
| G02F 1/1343 | (2006.01) |
| G02F 1/1335 | (2006.01) |
| G02F 1/1345 | (2006.01) |

(52) U.S. Cl.
CPC ...... *G02F 1/136286* (2013.01); *G02F 1/1339* (2013.01); *G02F 1/1343* (2013.01); *G02F 1/13452* (2013.01); *G02F 1/133512* (2013.01); *G02F 1/133553* (2013.01)

(58) Field of Classification Search
None
See application file for complete search history.

(56) References Cited

U.S. PATENT DOCUMENTS

| | | | |
|---|---|---|---|
| 5,808,354 A | * | 9/1998 | Lee ...................... H01L 23/4952 257/666 |
| 2016/0139446 A1 | * | 5/2016 | Li ........................ G02F 1/13458 349/58 |

FOREIGN PATENT DOCUMENTS

JP 2006267413 A 10/2006

\* cited by examiner

*Primary Examiner* — Edward J Glick
*Assistant Examiner* — David Y Chung
(74) *Attorney, Agent, or Firm* — Nath, Goldberg & Meyer; Jerald L. Meyer (57) ABSTRACT

A liquid crystal display device includes a liquid crystal display element, a wiring substrate having a second terminal, and a light shielding mask. The liquid crystal display element includes a first substrate having a first terminal and a display pixel unit, and a second substrate disposed at a side where illumination light is irradiated to the first substrate. A bonding wire has an arch shape, is formed such that a top of the bonding wire is lower than an upper surface of the second substrate, is joined to the first terminal by first bonding, and is joined to the second terminal by second bonding. The light shielding mask has a light transmitting region corresponding to the display pixel unit and is disposed at a side where the illumination light is irradiated to the liquid crystal display element.

3 Claims, 8 Drawing Sheets

FIG. 7C ns of the flexible wiring substrate become long, the bonding wires may be easily disconnected at the neck parts thereof.

LIQUID CRYSTAL DISPLAY DEVICE AND MANUFACTURING METHOD THEREOF

CROSS REFERENCE TO RELATED APPLICATION

This application is based upon and claims the benefit of priority under 35 U.S.C. § 119 from Japanese Patent Application No. 2018-038466 filed on Mar. 5, 2018, the entire contents of which are incorporated herein by reference.

BACKGROUND

The present disclosure relates to a liquid crystal display device and a manufacturing method thereof.

A liquid crystal display device is used in a display apparatus such as a projector or a head-up display. The liquid crystal display device generates image light by photoelectrically converting irradiated illumination light with respect to each pixel. The display apparatus projects the image light generated by the liquid crystal display device onto a screen or the like, thereby displaying an image. Japanese Unexamined Patent Application Publication No. 2006-267413 discloses an example of a liquid crystal display device.

SUMMARY

A liquid crystal display element has a display pixel unit where a plurality of pixels are disposed. The liquid crystal display element generates image light by photoelectrically converting illumination light irradiated to the display pixel unit with respect to each pixel. Above the liquid crystal display element, a light shielding mask is disposed. The light shielding mask blocks illumination light irradiated to a region other than the display pixel unit. In order to precisely block the region other than the display pixel unit, it is preferable that the light shielding mask is disposed close to the liquid crystal display element.

Typically, in a liquid crystal display device, a liquid crystal display element and a flexible wiring substrate are connected to each other via bonding wires. There is a tendency that the number of terminals of the flexible wiring substrate, which is connected to the liquid crystal display element via the bonding wires, has been increased in recent years. Accordingly, disposing of the terminals of the flexible wiring substrate in multi-stages is required.

When terminals of the liquid crystal display element and the terminals of the flexible wiring substrate are connected to each other via the bonding wires, it is preferable to wire-bond the terminals to each other by adjusting the heights of the bonding wires according to distances between the terminals of the liquid crystal display element and the terminals of the flexible wiring substrate.

Specifically, as the distances between the terminals of the liquid crystal display element and the terminals of the flexible wiring substrate become long, it is preferable to extend the tops of the bonding wires. However, when the tops of the bonding wires are stretched, the bonding wires and the light shielding mask contact with each other. When the bonding wires and the light shielding mask contact with each other, the bonding wires contact with each other, thereby resulting in the deterioration of the performance or reliability of the liquid crystal display device.

When the heights of the bonding wires are limited such that the light shielding mask and the bonding wires do not contact with each other, as the distances between the terminals of the liquid crystal display element and the terminals A first aspect of one or more embodiments provides a liquid crystal display device comprising: a liquid crystal display element including a first terminal and a display pixel unit having a plurality of pixel electrodes disposed therein, and photoelectrically converting illumination light irradiated from an outside with respect to each pixel electrode; a wiring substrate including a second terminal; a bonding wire that is joined to the first terminal by first bonding and is joined to the second terminal by second bonding to connect the liquid crystal display element and the wiring substrate to each other; a bonding reinforcing member formed on a joint part with the second terminal in the bonding wire; and a light shielding mask disposed at a side where the illumination light is irradiated to the liquid crystal display element, the liquid crystal display element includes a first substrate including the first terminal and the display pixel unit; a second substrate disposed with a predetermined gap at a side where the illumination light is irradiated to the first substrate and having an opposite electrode facing the plurality of pixel electrodes; a seal material formed along an outer peripheral part of the display pixel unit to fix the first substrate and the second substrate; and a liquid crystal filled in the predetermined gap and sealed by the seal material, the light shielding mask includes a light transmitting region corresponding to the display pixel unit; and the bonding wire having an arch shape and being formed such that a top of the bonding wire is lower than an upper surface of the second substrate.

A second aspect of one or more embodiments provides a manufacturing method of a liquid crystal display device, comprising the steps of: fixing a liquid crystal display element and a wiring substrate including a second terminal, the liquid crystal display element including a first substrate having a first terminal and a display pixel unit, a second substrate, a seal material, and a liquid crystal, the display pixel unit having a plurality of pixel electrodes disposed therein and photoelectrically converting illumination light irradiated from an outside with respect to each pixel electrode, the second substrate being disposed with a predetermined gap at a side where the illumination light is irradiated to the first substrate and having an opposite electrode facing the plurality of pixel electrodes, the seal material being formed along an outer peripheral part of the display pixel unit to fix the first substrate and the second substrate, the liquid crystal being filled in the predetermined gap and sealed by the seal material; joining a bonding wire to the first terminal by first bonding; joining the bonding wire to the second terminal by second bonding such that the bonding wire has an arch shape, and a top of the bonding wire is lower than an upper surface of the second substrate; forming a bonding reinforcing member on a joint part with the second terminal in the bonding wire; and disposing a light shielding mask, which has a light transmitting region corresponding to the display pixel unit, at a side where the illumination light is irradiated to the liquid crystal display element such that the light transmitting region is located at a side where the illumination light is irradiated to the display pixel unit.

DETAILED DESCRIPTION

Figure 1:
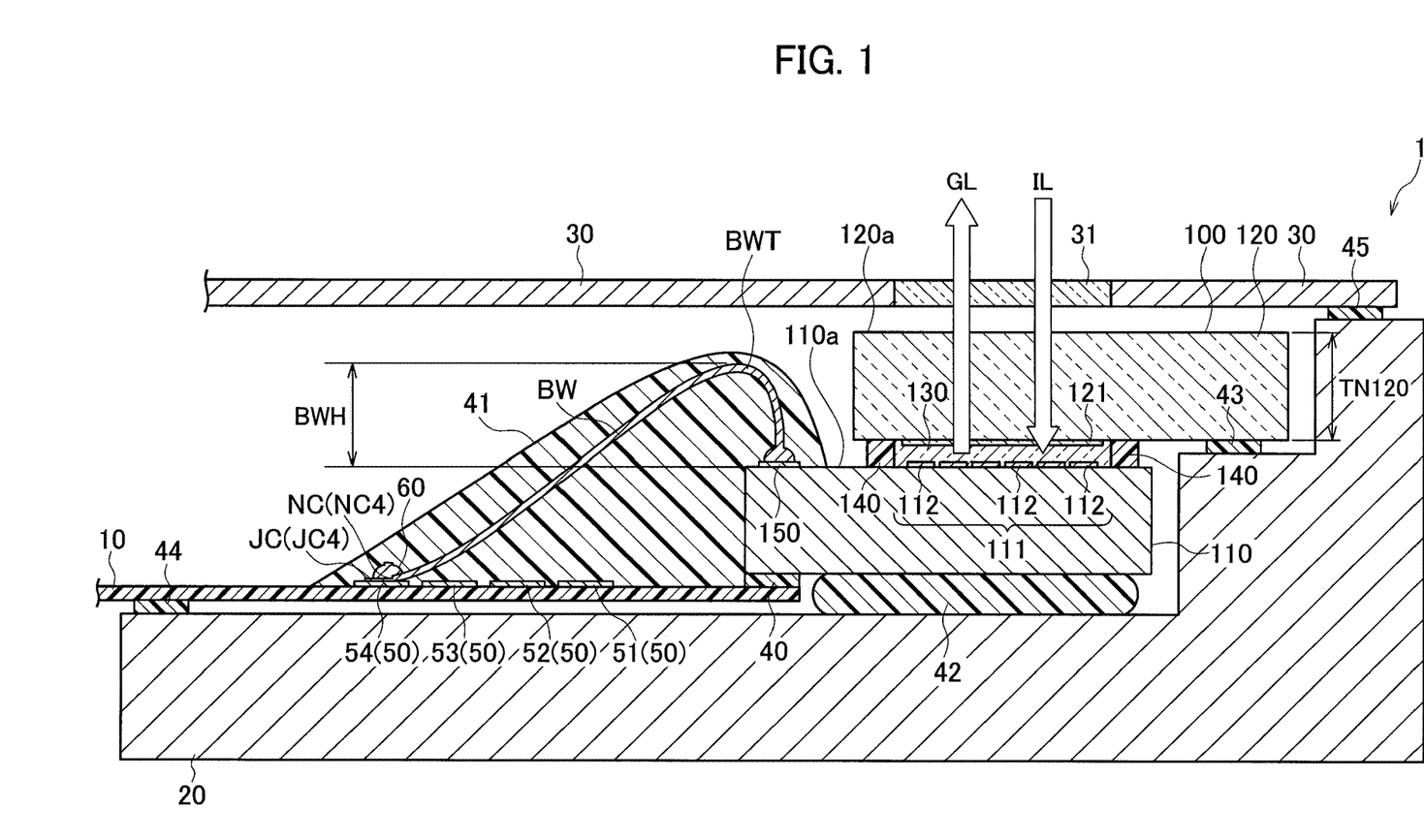
FIG. 1 is a cross-sectional view illustrating a liquid crystal display device according to one or more embodiments.
Figure 2:
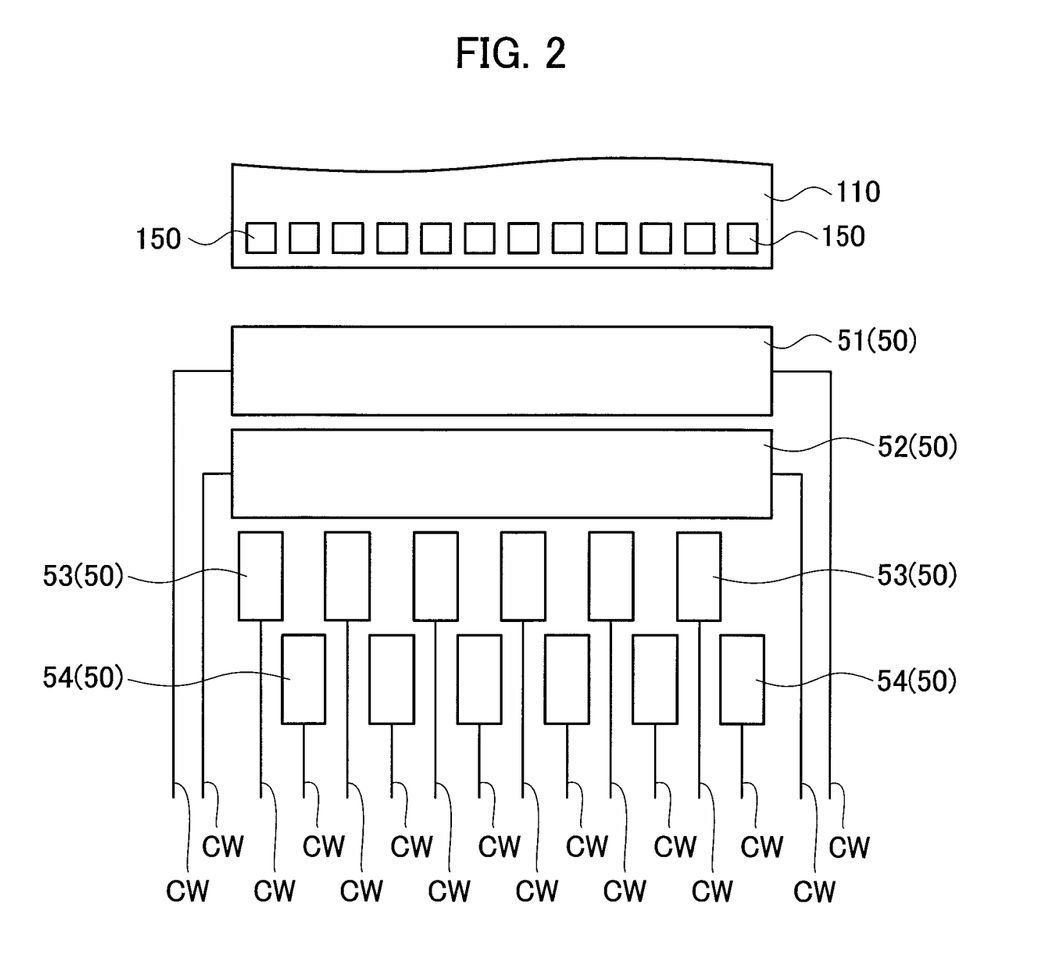
FIG. 2 is a plan view illustrating terminals of a liquid crystal display element and terminals of a wiring substrate.

With reference to FIGS. 1 and 2, a liquid crystal display device according to one or more embodiments will be described. FIG. 1 illustrates a configuration example of the liquid crystal display device according to one or more embodiments. FIG. 2 illustrates terminals of a liquid crystal display element and terminals of a wiring substrate. As illustrated in FIG. 1, a liquid crystal display device 1 includes a liquid crystal display element 100, a wiring substrate 10, a heat sink 20, and a light shielding mask 30. As the wiring substrate 10, a flexible wiring substrate may be used. As a material of the heat sink 20, an aluminum or an aluminum alloy may be used.

The liquid crystal display element 100, for example, is a reflection type liquid crystal display element. The liquid crystal display element 100 has a driving substrate 110 (a first substrate), a transparent substrate 120 (a second substrate), a liquid crystal 130, and a seal material 140. As illustrated in FIG. 1 or 2, the driving substrate 110 has a display pixel unit 111 and a plurality of terminals 150 (a first terminal). In the display pixel unit 111, a plurality of pixel electrodes 112 (a first electrode) are disposed. As the driving substrate 110, a silicon substrate may be used. The pixel electrode 112 has light reflectivity. As a material of the pixel electrode 112, an aluminum or an aluminum alloy may be used.

The transparent substrate 120 is disposed above the driving substrate 110. The transparent substrate 120 has an opposite electrode 121 (a second electrode). The opposite electrode 121 is disposed above the display pixel unit 111 to face the plurality of pixel electrodes 112. The plurality of terminals 150 are connected to the display pixel unit 111 of the driving substrate 110 and the opposite electrode 121. The transparent substrate 120 and the opposite electrode 121 have a light transmission property. That is, the opposite electrode 121 is a transparent electrode. As the transparent substrate 120, a glass plate may be used. As a material of the opposite electrode 121, an indium tin oxide (ITO) may be used.

The driving substrate 110 and the transparent substrate 120 are fixed by the seal material 140 with a predetermined gap. The seal material 140 is formed in an annular shape along an outer peripheral part of the display pixel unit 111. The liquid crystal 130 is filled in the gap between the driving substrate 110 and the transparent substrate 120, and is sealed by the seal material 140. The plurality of terminals 150 are formed in an outer peripheral part of the driving substrate 110, which is a region outside the transparent substrate 120.

The driving substrate 110 of the liquid crystal display element 100 and the wiring substrate 10 are positioned and are fixed by an adhesive member 40. As the adhesive member 40, a sheet-like adhesive member may be used. The wiring substrate 10 has a plurality of terminals (a second terminal). FIG. 2 illustrates a case when the terminals 50 of the wiring substrate 10 are disposed in four stages as an example where the terminals 50 are disposed in multi-stages.

In order to distinguish the terminals 50 from one another, the terminal 50 of the first stage closest to the liquid crystal display element 100 is set as a terminal 51, the terminal 50 of the second stage near the liquid crystal display element 100 next to the terminal 51 is set as a terminal 52, the terminal 50 of the third stage near the liquid crystal display element 100 next to the terminal 52 is set as a terminal 53, and the terminal 50 of the fourth stage furthest from the liquid crystal display element 100 is set as a terminal 54. For example, the terminal 51 is a ground terminal, the terminal 52 is a power terminal, and the terminal 53 and the terminal 54 are signal terminals. A reference numeral CW illustrated in FIG. 2 simplifies and illustrates wirings formed in the wiring substrate 10 to connect the terminals 51 to 54 to one another. The terminals 51 to 54 illustrated in FIG. 2 correspond to the terminals 51 to 54 illustrated in FIG. 1.

The driving substrate 110 of the liquid crystal display element 100 and the wiring substrate 10 are connected to each other by a plurality of bonding wires BW. Specifically, the plurality of terminals 150 of the liquid crystal display element 100 and the terminals 51 to 54 of the wiring substrate 10 are connected to each other by the bonding wires BW. As a material of the bonding wire BW, gold may be used. FIG. 1 illustrates only one bonding wire BW that connects the terminal 150 of the liquid crystal display element 100 and the terminal 54 of the wiring substrate 10.

In wire bonding for forming the bonding wires BW, the plurality of terminals 150 of the liquid crystal display element 100 serve as bonding pads for performing first bonding. The terminals 51 to 54 of the wiring substrate 10 serve as bonding pads for performing second bonding.

The bonding wires BW are joined to the plurality of terminals 150 of the liquid crystal display element 100 by the first bonding (ball bonding), and are joined to the terminals 51 to 54 of the wiring substrate 10 by the second bonding (wedge bonding).

The bonding wire BW has an arch shape. The bonding wire BW is formed such that a top BWT of the bonding wire BW is lower than an upper surface 120a of the transparent substrate 120. Actually, thicknesses of the seal material 140 and an adhesive member 43 are negligibly thin as compared with a thickness TN120 of the transparent substrate 120.

Accordingly, the bonding wire BW may be formed such that a height BWH of the bonding wire BW is shorter than the thickness TN120 of the transparent substrate 120 (BWH<TN120). The height BWH of the bonding wire BW is a height from an upper surface 110a of the driving substrate 110 to the top BWT of the bonding wire BW.

A sealing resin 41 is formed on the driving substrate 110 and the wiring substrate 10 to cover the plurality of bonding wires BW and the plurality of terminals 50 (51 to 54). The sealing resin 41 protects the plurality of bonding wires BW from external mechanical stress and improves moisture resistance to the plurality of bonding wires BW. Furthermore, the sealing resin 41 fixes a relative position between the driving substrate 110 and the wiring substrate 10.

In a case of using thermosetting resin as the sealing resin 41, the sealing resin 41 is cured and contracted when the sealing resin 41 is cured by heat. Tensile stress is generated in the bonding wires BW according to the resin curing of the sealing resin 41, thereby causing disconnection of the bonding wires BW. Therefore, it is preferable to use ultraviolet-curing resin, which is rarely cured and contracted as compared with the thermosetting resin, as the sealing resin 41.

The driving substrate 110 of the liquid crystal display element 100 is disposed on the heat sink 20 with a gelatinous heat conductive member 42 interposed therebetween. The gelatinous heat conductive member 42 serves as a cushion material that protects the liquid crystal display element 100 from external mechanical stress. The transparent substrate 120 of the liquid crystal display element 100 is positioned with the heat sink 20 and is fixed onto the heat sink 20 by the adhesive member 43. As the adhesive member 43, ultraviolet-curing resin may be used.

The wiring substrate 10 is fixed onto the heat sink by an adhesive member 44. The adhesive member 44 protects the wiring substrate 10 from external mechanical stress and protects the liquid crystal display element 100 from mechanical stress due to a self-weight or the like of the wiring substrate 10. As the adhesive member 44, it may be possible to use resin in which both photocuring (for example, ultraviolet curing) and heat curing are possible.

The light shielding mask 30 is disposed above the liquid crystal display element 100. The light shielding mask 30 corresponds to the display pixel unit 111 of the liquid crystal display element 100 and has a light transmitting region 31 that allows light to pass therethrough. The light shielding mask 30 may be configured to have an opening instead of the light transmitting region 31. The light shielding mask 30 is positioned with the heat sink 20 and the liquid crystal display element 100 such that the light transmitting region 31 and the display pixel unit 111 correspond to each other, and is fixed onto the heat sink 20 by an adhesive member 45.

The light shielding mask 30 blocks light incident into regions other than the display pixel unit 111. In order to precisely block the regions other than the display pixel unit 111, the light shielding mask 30 is preferably disposed close to the liquid crystal display element 100. As the adhesive member 45, ultraviolet-curing resin may be used.

Image data is inputted to the liquid crystal display element 100 from an outside through the wiring substrate 10, so that a driving voltage based on the image data is applied to each pixel electrode 112. Illumination light IL passes through the light transmitting region 31 of the light shielding mask 30 from an outside and further passes through the transparent substrate 120 of the liquid crystal display element 100, and thereafter is irradiated to the display pixel unit 111. The illumination light IL is photoelectrically converted by the liquid crystal display element 100 for each pixel electrode 112, so that image light GL is generated.

The light shielding mask 30 is disposed at a side, where the illumination light IL is irradiated to the liquid crystal display element 100, such that the light transmitting region 31 is located at a side where the illumination light IL is irradiated to the display pixel unit 111. The transparent substrate 120 is disposed with a predetermined gap at a side where the illumination light IL is irradiated to the driving substrate 110.

The image light GL is reflected by the plurality of pixel electrodes 112, and is emitted outward by passing through the light transmitting region 31 of the light shielding mask 30. The image light GL is projected onto a screen or the like through a projection lens, so that an image is displayed on the screen or the like.

Figure 3:
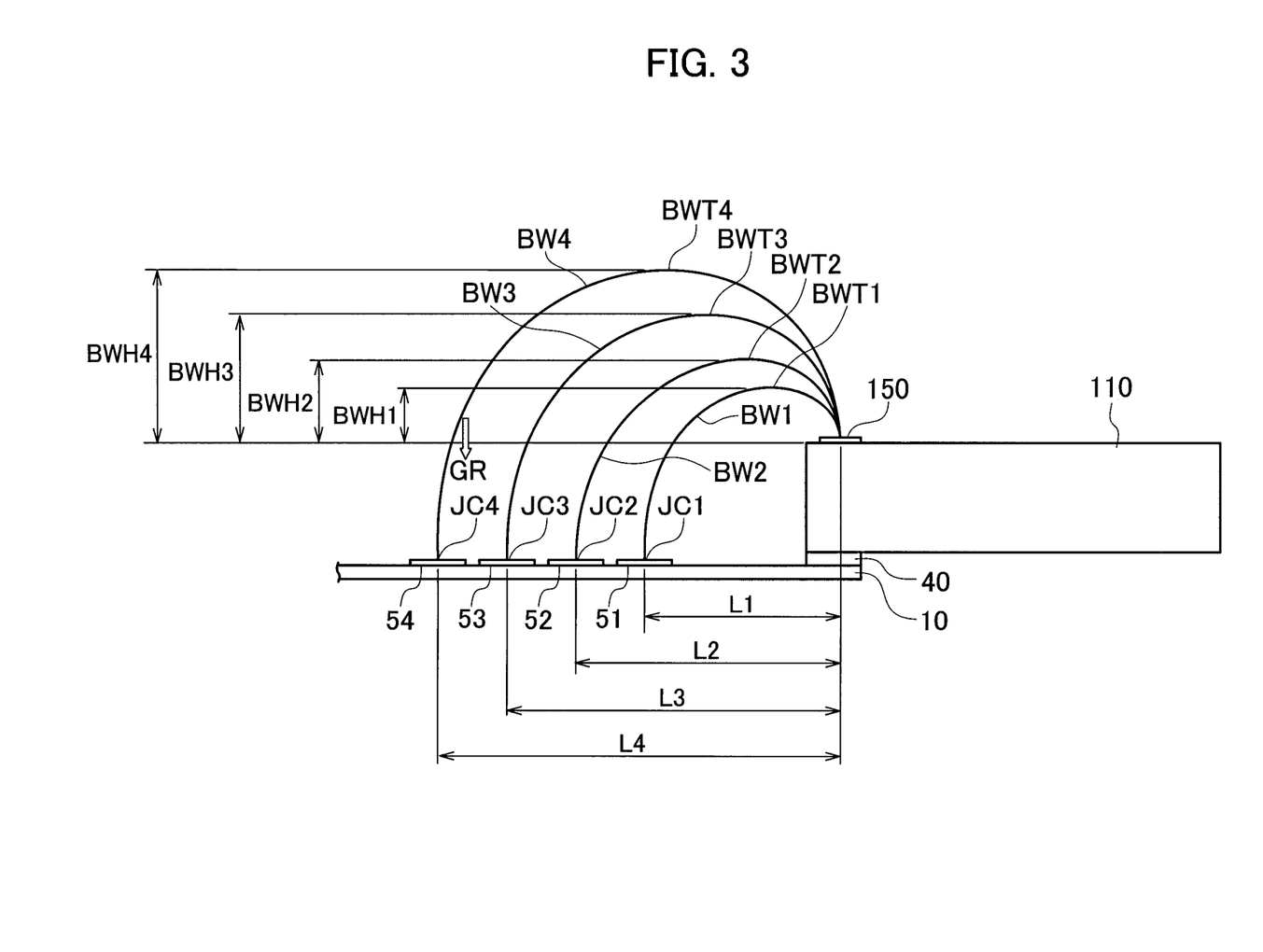
FIG. 3 is a view illustrating a relation between distances from the terminals of the liquid crystal display element to the terminals of the wiring substrate, and heights of bonding wires.

FIG. 3 illustrates a relation between distances of the terminals 150 of the liquid crystal display element 100 and the terminals 51 to 54 of the wiring substrate 10 thereto, and the heights of the bonding wires BW. FIG. 3 simplifies and illustrates joint parts between the bonding wires BW and the terminals 150 and 50 in the bonding wires BW.

Respective reference numerals illustrated in FIG. 3 will be described. Reference numerals L1 to L4 (L1<L2<L3<L4) discriminately indicate distances L between the terminal 150 of the liquid crystal display element 100 and the terminals 50 (51 to 54) of the wiring substrate 10. Reference numerals BW1 to BW4 discriminately indicate the bonding wires BW according to the distances L1 to L4.

Reference numerals BWH1 to BWH4 indicate heights BWH of the bonding wires BW1 to BW4, specifically, the heights BWH of tops BWT1 to BWT4 of the bonding wires BW1 to BW4.

As the distances L between the terminal 150 of the liquid crystal display element 100 and the terminals 50 of the wiring substrate 10 become long, it is preferable to increase radiuses of the arch shapes of the bonding wires BW. In this way, the gravity GR acting on the bonding wires BW1 to BW4 is applied to joint parts JC1 to JC4 with the terminals 51 to 54 of the wiring substrate 10 in the bonding wires BW1 to BW4 from a vertical direction.

Therefore, it is possible to suppress an influence of stress acting on the joint parts JC1 to JC4. Thus, as the distances L between the terminal 150 of the liquid crystal display element 100 and the terminals 50 of the wiring substrate 10 become long, the heights BWH of the bonding wires BW increase (BWH1<BWH2<BWH3<BWH4).

However, in the liquid crystal display device 1, when the heights BWH of the bonding wires BW increase, the bonding wires BW and the light shielding mask 30 contact with each other. Accordingly, the bonding wires BW contact with one another, thereby resulting in the deterioration of the performance or reliability of the liquid crystal display device 1.

Figure 4:
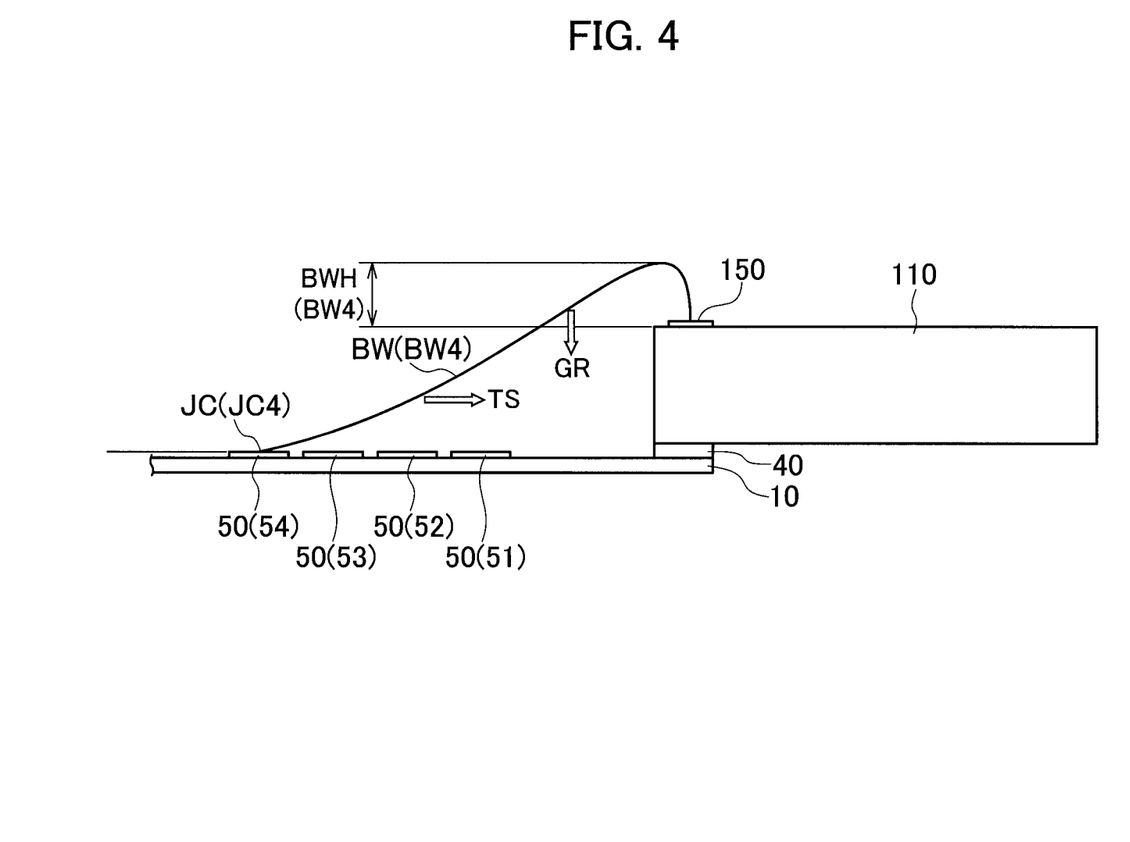
FIG. 4 is a view illustrating a state where the height of the bonding wire is limited.

FIG. 4 illustrates a state where the height BWH (BWH4) of the bonding wire BW (BW4) has been limited. As illustrated in FIG. 4, when the height BWH of the bonding wire BW has been limited, the bonding wire BW is loosened. Due to the gravity GR acting on the loosened bonding wire BW, horizontal tensile stress TS acts on the joint parts JC (JC4) with the terminal 50 in the bonding wire BW (BW4).

When the height BWH of the bonding wire BW has been limited, the distances L between the terminal 150 of the liquid crystal display element 100 and the terminals 50 of the wiring substrate 10 become long, thereby resulting in an increase in the tensile stress TS due to the loosening of the bonding wire BW.

Accordingly, as the distances L become long, the bonding wire BW is easily disconnected at the joint part JC with the terminals 50. FIG. 4 illustrates only the bonding wire BW4, on which the largest tensile stress TS acts, among the bonding wires BW1 to BW4 in order to facilitate description.

In this regard, as illustrated in FIG. 1, a bonding reinforcing member 60 is formed on the joint part JC with the terminal 50 in the bonding wire BW. The bonding reinforcing member 60 is formed on the joint part JC to cover a neck portion NC of the joint part JC at which the bonding wire BW is easily disconnected. The neck portion NC corresponds to a boundary part with the joint part JC in the bonding wire BW.

FIG. 1 illustrates a state where the bonding reinforcing member 60 is formed at a neck portion NC4 of the joint part JC4 of the bonding wire BW4, on which the largest tensile stress TS acts, among the bonding wires BW1 to BW4.

The bonding reinforcing member 60 may be formed only at the neck portion NC of the joint part JC4 of the bonding wire BW4, on which the largest tensile stress TS acts, among the bonding wires BW1 to BW4, or may be formed only at the neck portions NC of the joint parts JC4 and JC3 of the bonding wires BW4 and BW3.

Furthermore, the bonding reinforcing member 60 may be formed only at the neck portions NC of the joint parts JC4, JC3, and JC2 of the bonding wires BW4, BW3, and BW2, or may be formed at each neck portion NC of the joint parts JC (JC1 to JC4) of all the bonding wires BW (BW1 to BW4).

Figure 5:
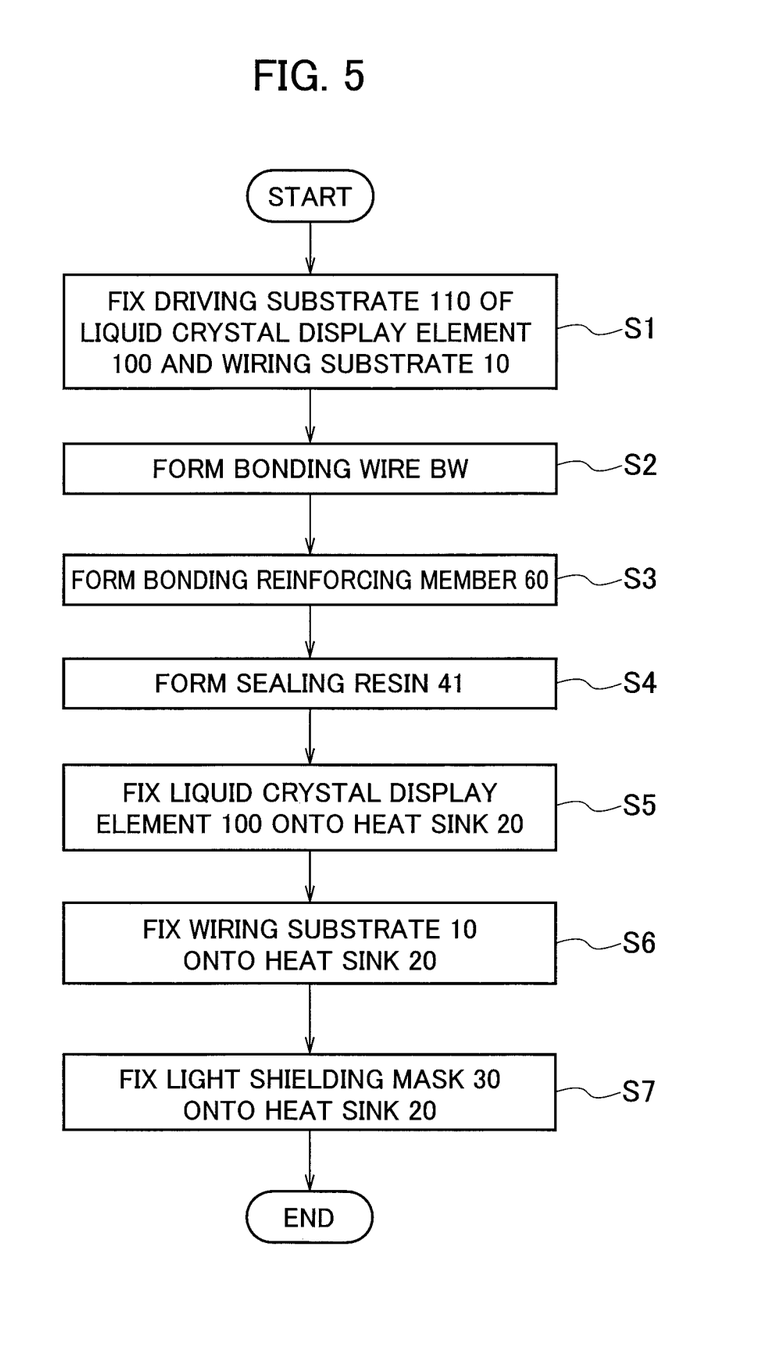
FIG. 5 is a flowchart illustrating an example of a manufacturing method of the liquid crystal display device.

With reference to a flowchart illustrated in FIG. 5, an example of a manufacturing method of the liquid crystal display device 1 will be described using FIGS. 6A and 6B, and FIGS. 7A to 7C. FIGS. 6A and 6B and FIGS. 7A to 7C illustrate each step of the manufacturing method of the liquid crystal display device 1. In step S1 of the flowchart illustrated in FIG. 5, an operator performs positioning of the driving substrate 110 of the liquid crystal display element 100 and the wiring substrate 10, and fixes the driving substrate 110 and the wiring substrate 10 by the adhesive member 40.

In step S2, the operator forms the bonding wires BW, which connect the driving substrate 110 of the liquid crystal display element 100 and the wiring substrate 10 to each other, by wire bonding. Specifically, the operator forms the plurality of bonding wires BW for connecting the plurality of terminals 150 of the liquid crystal display element 100 and the terminals 50 (51 to 54) of the wiring substrate 10 to each other.

The operator performs the first bonding (the ball bonding) on the terminals 150 of the liquid crystal display element 100. The operator performs the second bonding (the wedge bonding) on the terminals 50 (51 to 54) of the wiring substrate 10 such that the tops BWT of the bonding wires BW are lower than the upper surface 120a of the transparent substrate 120, for example, the heights BWH of the bonding wires BW are shorter than the thickness TN120 of the transparent substrate 120.

Figure 6A:
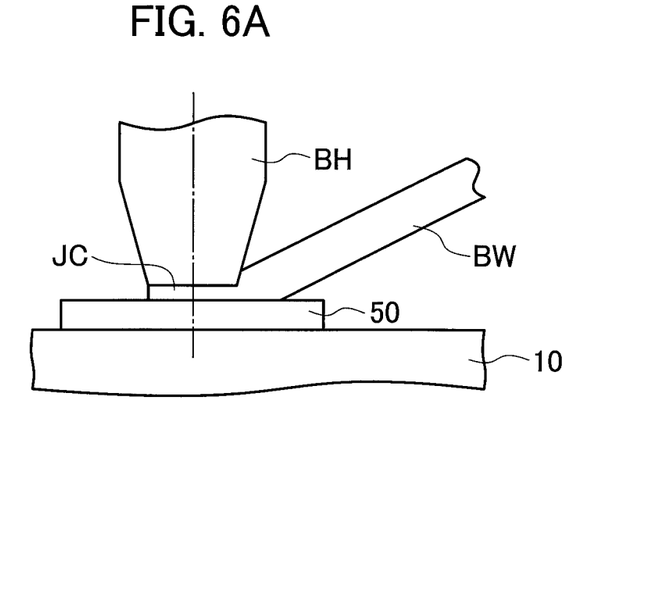
FIG. 6A is a view illustrating one step of the manufacturing method of the liquid crystal display device.

FIG. 6A illustrates a state where the bonding wire BW is subjected to the second bonding with respect to the terminal 50 of the wiring substrate 10. The reference numeral BH illustrated in FIG. 6A indicates a bonding head for the wire bonding. A bonding head BH, for example, is a capillary. FIG. 6B and FIGS. 7A to 7C correspond to FIG. 6A. The operator performs the second bonding by operating the bonding head BH. The bonding wire BW is crimped to the terminal 50 by the bonding head BH, so that the bonding wire BW is joined to the terminal 50.

Figure 6B:
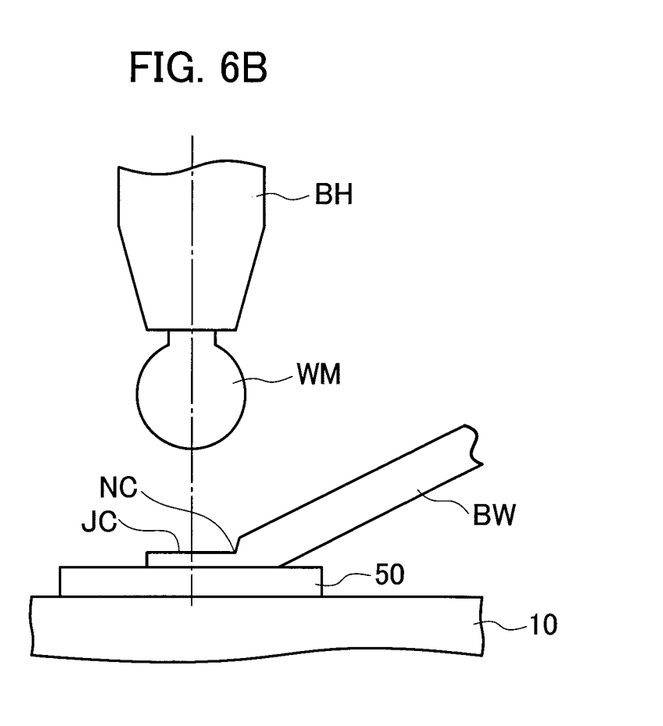
FIG. 6B is a view illustrating one step of the manufacturing method of the liquid crystal display device.

As illustrated in FIG. 6B, the bonding head BH is moved upward from the terminal 50 by the operator. The bonding wire BW for connecting the terminal 150 of the driving substrate 110 and the terminal 50 of the wiring substrate 10 to each other is formed. A distal end part of the bonding wire BW, which is exposed from a distal end of the bonding head BH moved above the terminal 50 is melted, so that a spherical wire melt-solidified material WM is formed.

The joint part JC with the terminal 50 in the bonding wire BW is formed when the bonding head BH crimps the bonding wire BW to the terminal 50. Therefore, the bonding wire BW becomes thin at the joint part JC.

As illustrated in FIG. 4, when the height BWH of the bonding wire BW has been limited, the tensile stress TS acts due to the loosening of the bonding wire BW. Therefore, the bonding wire BW is easily disconnected at the neck portion NC of the joint part JC.

Figure 7A:
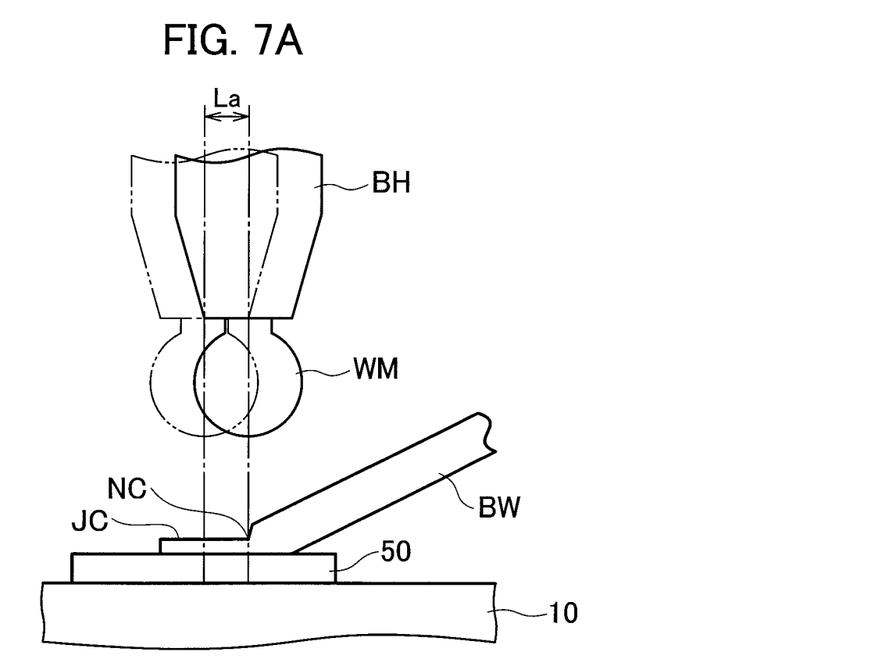
FIG. 7A is a view illustrating one step of the manufacturing method of the liquid crystal display device.

In step S3, the operator forms the bonding reinforcing member 60 on the neck portion NC of the joint part JC. As illustrated in FIG. 7A, the operator moves the bonding head BH by a predetermined distance La in a direction approaching the terminal 150 such that the wire melt-solidified material WM is positioned above the neck portion NC of the joint part JC. Preferably, the predetermined distance La is set in a range of 50 μm to 100 μm.

Figure 7B:
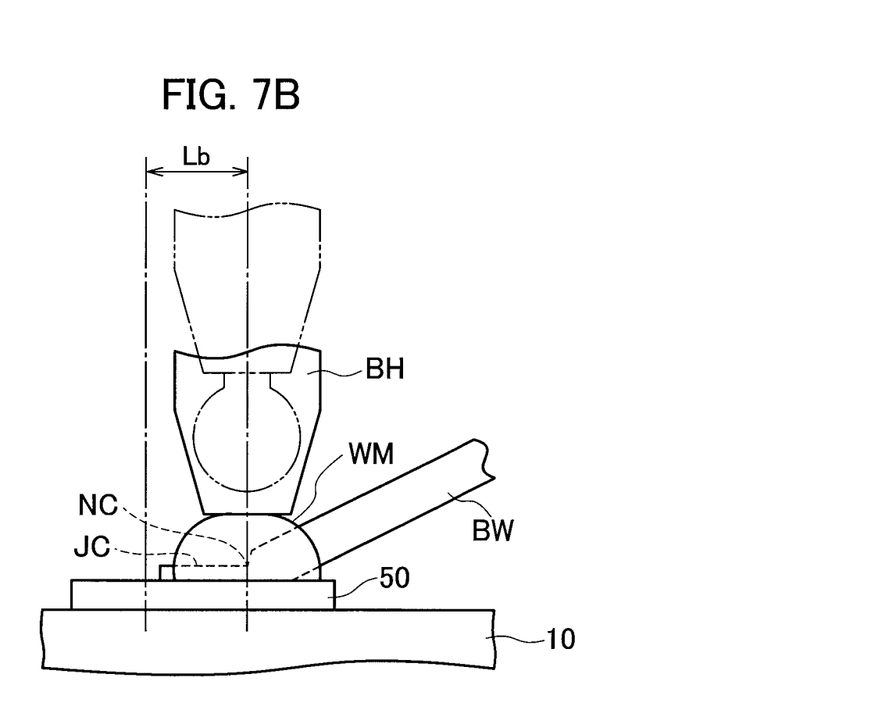
FIG. 7B is a view illustrating one step of the manufacturing method of the liquid crystal display device.

Moreover, as illustrated in FIG. 7B, the operator continuously performs the first bonding (the ball bonding) and the second bonding (the wedge bonding) on the terminal 50 when the bonding head BH is positioned above the neck portion NC.

In this way, the bonding head BH crimps the wire melt-solidified material WM to the terminal 50 to cover the neck portion NC. After the first bonding is performed, the bonding head BH may be moved by a predetermined distance Lb and the second bonding may be performed on the terminal 50.

Figure 7C:
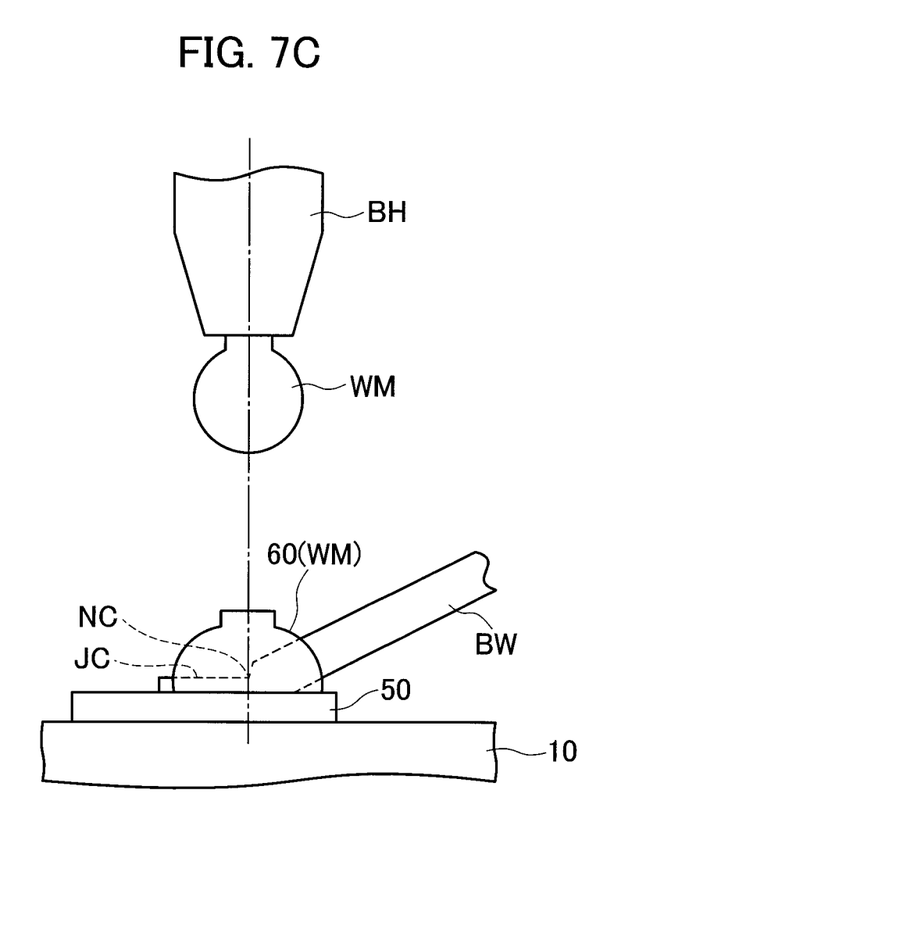
FIG. 7C is a view illustrating one step of the manufacturing method of the liquid crystal display device.

As illustrated in FIG. 7C, the bonding head BH is moved upward from the terminal 50 by the operator. The wire melt-solidified material WM crimped onto the terminal 50 is formed on the terminal 50 as the bonding reinforcing member 60. The bonding reinforcing member 60 is formed on the terminal 50 to cover the neck portion NC which is easily disconnected, so that it is possible to improve the strength of the joint part JC including the neck portion NC of the bonding wire BW.

The operator connects the terminals 150 of the driving substrate 110 and the terminals 50 (51 to 54) of the wiring substrate 10 to each other by the plurality of bonding wires BW. The operator forms the bonding reinforcing member 60 on each terminal 50 to cover the neck portions NC of the plurality of the bonding wires BW.

The operator may alternately form the bonding wires BW and the bonding reinforcing member 60 for each bonding wire BW, or may form the bonding reinforcing member 60 with respect to each bonding wire BW after the plurality of bonding wires BW are formed. The operator operates a wire bonding apparatus so that the wire bonding apparatus may perform steps S2 and S3.

In step S4, the operator forms the sealing resin 41 on the driving substrate 110 and the wiring substrate 10 to cover the plurality of bonding wires BW and, the plurality of terminals 50 (51 to 54) and 150.

In step S5, the operator disposes the driving substrate 110 of the liquid crystal display element 100 on the heat sink 20 with the heat conductive member 42 interposed therebetween. Moreover, the operator performs positioning of the liquid crystal display element 100 to the heat sink 20 and fixes the transparent substrate 120 of the liquid crystal display element 100 onto the heat sink 20 by using the adhesive member 43. In this way, the liquid crystal display element 100 is positioned to the heat sink and is fixed onto the heat sink 20 by the adhesive member 43.

In step S6, the operator fixes the wiring substrate 10 onto the heat sink 20 by using the adhesive member 44. In step S7, the operator disposes the light shielding mask 30 above the liquid crystal display element 100 such that the light transmitting region 31 is located above the display pixel unit 111. Moreover, the operator performs positioning of the light shielding mask 30 to the heat sink 20 and the liquid crystal display element 100. Moreover, the operator fixes the light shielding mask 30 onto the heat sink 20 by using the adhesive member 45. The liquid crystal display device 1 is manufactured by the aforementioned steps S1 to S7.

In the liquid crystal display device 1 according to one or more embodiments and the manufacturing method of the liquid crystal display device 1, the bonding reinforcing member 60 is formed on the terminal 50 to cover the neck portion NC at which the bonding wire BW is easily disconnected. Therefore, even though the height of the bonding wire BW is limited by the light shielding mask 30, the strength of the joint part JC including the neck portion NC of the bonding wire BW by the bonding reinforcing member 60 can be improved with the liquid crystal display device 1 according to one or more embodiments and the manufacturing method thereof.

Thus, in accordance with the liquid crystal display device 1 according to one or more embodiments and the manufacturing method of the liquid crystal display device 1, even though the height of the bonding wire BW is limited, it is possible to suppress disconnection of the bonding wire BW.

The present invention is not limited to the aforementioned embodiments, but can be modified in various ways without departing from the scope of the present invention.

What is claimed is:

1. A liquid crystal display device comprising:
    a liquid crystal display element including a first terminal and a display pixel unit having a plurality of pixel electrodes disposed therein and photoelectrically converting illumination light irradiated from an outside with respect to each pixel electrode;
    a wiring substrate including second terminals disposed in multiple stages;
    a bonding wire that is joined to the first terminal by first bonding and is joined to the second terminals by second bonding to connect the liquid crystal display element and the wiring substrate to each other;
    a bonding reinforcing member formed on a joint part with the second terminals in the bonding wire;
    a light shielding mask disposed at a side where the illumination light is irradiated to the liquid crystal display element;
    a sealing resin covering the bonding wire and the first and second terminals; and
    a heat sink,
    wherein the liquid crystal display element includes:
        a first substrate including the first terminal and the display pixel unit;
        a second substrate disposed with a predetermined gap at a side where the illumination light is irradiated to the first substrate and having an opposite electrode facing the plurality of pixel electrodes;
        a seal material formed along an outer peripheral part of the display pixel unit to fix the first substrate and the second substrate; and
        a liquid crystal filled in the predetermined gap and sealed by the seal material,
    wherein the light shielding mask includes:
        a light transmitting region corresponding to the display pixel unit; and
        the bonding wire having an arch shape and being formed such that a top of the bonding wire is lower than an upper surface of the second substrate,
    wherein the first substrate is disposed on the heat sink with a heat conductive member interposed therebetween, and
    and wherein the second substrate and the light shielding mask are positioned with the heat sink, and are fixed onto the heat sink with adhesive members.

2. The liquid crystal display device according to claim 1, wherein
    the bonding reinforcing member is formed on the joint part to cover a boundary part with the joint part in the bonding wire.

3. A manufacturing method of a liquid crystal display device, comprising the steps of:
    fixing a liquid crystal display element and a wiring substrate including second terminals disposed in multiple stages, the liquid crystal display element including a first substrate having a first terminal and a display pixel unit, a second substrate, a seal material, and a liquid crystal, the display pixel unit having a plurality of pixel electrodes disposed therein and photoelectrically converting illumination light irradiated from an outside with respect to each pixel electrode, the second substrate being disposed with a predetermined gap at a side where the illumination light is irradiated to the first substrate and having an opposite electrode facing the plurality of pixel electrodes, the seal material being formed along an outer peripheral part of the display pixel unit to fix the first substrate and the second substrate, the liquid crystal being filled in the predetermined gap and sealed by the seal material;
    joining a bonding wire to the first terminal by first bonding;
    joining the bonding wire to the second terminals by second bonding such that the bonding wire has an arch shape and a top of the bonding wire is lower than an upper surface of the second substrate;
    forming a bonding reinforcing member on a joint part with the second terminals in the bonding wire;
    disposing a light shielding mask, which has a light transmitting region corresponding to the display pixel unit, at a side where the illumination light is irradiated to the liquid crystal display element such that the light transmitting region is located at a side where the illumination light is irradiated to the display pixel unit;
    covering the bonding wire and the first and second terminals with a sealing resin;
    disposing the first substrate on a heat sink with a heat conductive member interposed therebetween;
    positioning the second substrate and the light shielding mask with the heat sink; and
    fixing the second substrate and the light shielding mask onto the heat sink with adhesive members.

* * * * *